UNITED STATES PATENT OFFICE.

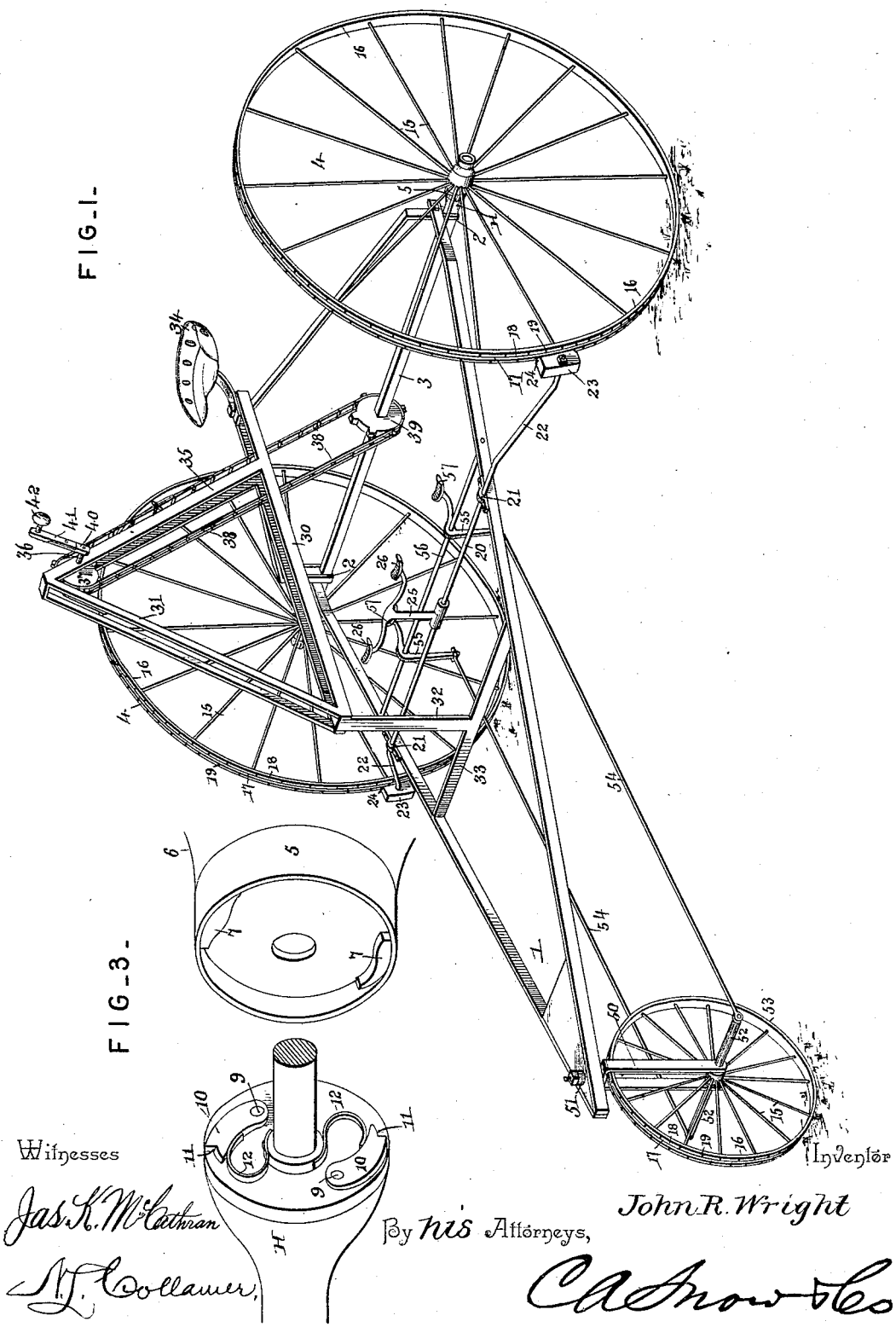

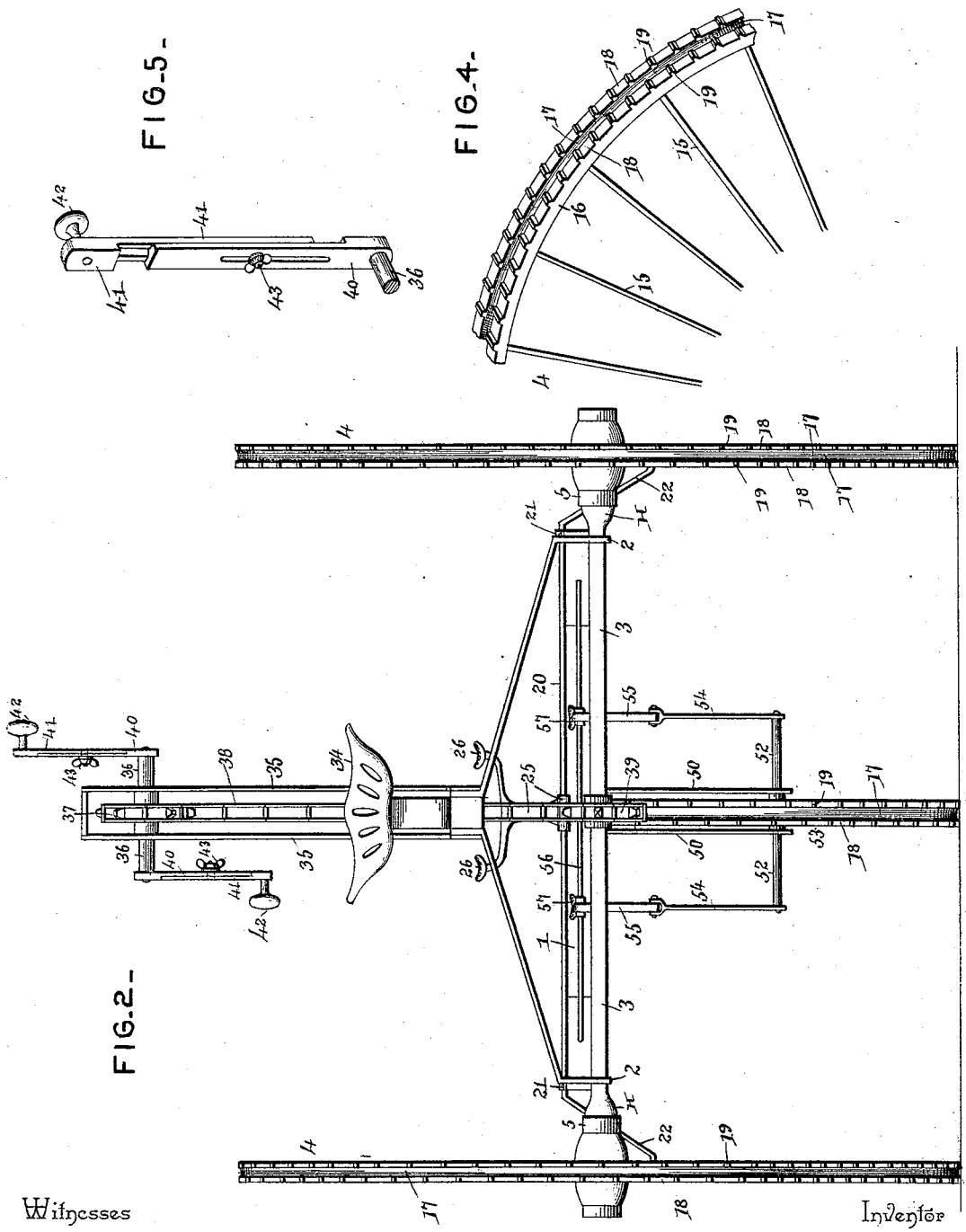

JOHN ROBERT WRIGHT, OF MOROCCO, INDIANA.

VELOCIPEDE.

SPECIFICATION forming part of Letters Patent No. 478,674, dated July 12, 1892.

Application filed December 26, 1891. Serial No. 416,224. (No model.)

*To all whom it may concern:*

Be it known that I, JOHN ROBERT WRIGHT, a citizen of the United States, residing at Morocco, in the county of Newton and State of Indiana, have invented a new and useful Velocipede, of which the following is a specification.

This invention relates to that class of vehicles known as "velocipedes," and more especially to such as are adapted to be driven over a road and as have three wheels, popularly known as "tricycles;" and the object of the same is to effect certain improvements in machines of this class.

To this end the invention consists in the construction hereinafter more fully described and claimed, and as illustrated on the two sheets of drawings, wherein—

Figure 1 is a general perspective view of this machine. Fig. 2 is a rear elevation thereof. Fig. 3 is a perspective detail of the parts of one of the ratchet-boxes slightly separated. Fig. 4 is a perspective detail of a portion of the rim of one of the driving-wheels. Fig. 5 is an enlarged perspective detail of one of the extensible cranks.

Referring to the said drawings, 1 is an approximately-A-shaped frame-work in bearings 2, at the rear end of which is journaled the main axle 3, and 4 4 are the main driving-wheels, journaled loosely on the ends of this axle. Inside the inner sand-band 5 of each hub 6 are located teeth 7, and on the axle is an enlargement H, to which are pivoted at 9 pawls 10, having notches 11 in their outer ends adapted to engage said teeth when thrown outwardly by the springs 12. These ratchet-boxes are so arranged as to permit the wheels to turn forward around the axle, but to prevent the latter turning forward without moving the wheels, and hence when the axle is rotated the wheels will be driven; but they will be allowed to turn backward or to stand idle, as is sometimes necessary during rounding curves. Each wheel (and this description includes the front or steering wheel hereinafter described) has spokes 15, supporting a rim 16, and the latter has a longitudinal groove or gutter 17 in its outer face, and at each side thereof a flat raised portion 18, provided with projections 19.

20 is a rock-shaft journaled in bearings 21 in the main frame-work, turned down at its ends, as at 22, and carrying blocks 23, having rounded rear faces 24, adapted to take into the gutters or grooves 17 of the main wheels 4 when it is desired to apply the brake. At the center of the rock-shaft 20 there is fastened thereon an upright 25, which is of T shape, and near the ends of its head it is provided with roughened places 26 for the feet of the operator. When this head is borne forward, the blocks 23 will be thrown against the main wheels, as will be understood.

30 is an arch standing over the rear axle and supported by the bearings 2, and from the top of this arch a slotted bar 31 leads forward, its front end being supported by an upright 32, mounted on a cross-bar 33 of the frame-work 1. A seat 34 is supported at the rear end of the slotted bar 31, or by a slight modification two seats may be supported thereby; but this will be understood. In suitable supports 35, rising from the slotted bar 31, is journaled a shaft 36, carrying a sprocket-wheel 37, and 38 is a chain connecting this wheel with another sprocket 39 on the main axle. On each end of the shaft 36 is a crank-handle comprising one member 40, secured to the shaft, another member 41, dovetailed onto the first member, so as to slide longitudinally thereon, a knob or handle 42 on this outer member, and a set-screw 43 for holding the two members in adjusted position. An operator sitting on the seat can grasp the handles 42 and drive the machine. Two operators could drive the machine by duplicating this driving mechanism and adding another sprocket-wheel to the main shaft, or with a slight change in construction the handles 42 could be replaced by pedals to receive the operator's feet.

50 is a fork journaled at 51 in the front end of the main frame-work 1, and to the lower end of this fork extends a shaft 52, whereon is journaled within the fork a front or steering-wheel 53. Obviously this steering-wheel might trail behind the machine by making certain changes in the construction of the latter; but I prefer the arrangement shown.

54 are rods leading from the ends of the shaft 52 back to bell-crank levers 55, which are pivoted at their angles on a cross-rod 56 in the frame-work, the upper ends of these levers being provided with foot-pieces 57, wherein the operator's feet normally rest, so that he may guide the machine as it is driven by his hands or by the combined efforts of himself and a second operator. Obviously when pedals are substituted for the handles 42, which are shown, the foot-pieces 57 will be replaced by handles, and the bell-crank levers 55 will be so arranged that the operator can guide the machine by hand while he propels it with his feet.

All parts of this machine are preferably of metal, such as light tubing or rod or strap iron, and considerable departure from the specific details of construction may be made without losing sight of my invention. The machine is intended for use upon roads which are more or less rough, and the projections 19 on the wheels will prevent their slipping, while the groove or gutter 17 will prevent lateral movement if the road should incline transversely. The operator is located high above the road, where he has a good view and where he is not in the mud in case it is wet weather. Much elaboration and addition may be made, such as the provision of other seats or packages and parcel-carriers, if desired, and the frame-work of the machine should be strengthened accordingly. I may have the steering-wheel made perfectly plain on its periphery or face.

What is claimed as new is—

1. In a tricycle, the combination, with an A-shaped frame-work, a main axle across its face, driving-wheels thereon, and means for rotating the axle, of a fork pivoted in the apex of the frame-work, a shaft through the fork, a steering-wheel journaled thereon, a cross-rod in the frame, bell-crank levers pivoted at their angles on said rod, and a rod connecting one arm of each lever with one end of said shaft, as set forth.

2. In a velocipede, the combination of an A-shaped frame-work, a main axle extending across the rear portion thereof, a vertical frame supported at the rear of and above the central portion of said A-shaped frame and having a sprocket-wheel and cranks for operating the same, a sprocket-wheel on the said axle, a chain belt connecting said sprocket-wheels, said vertical frame being slotted for the passage of the chain belt therethrough, and steering and brake mechanism, substantially as described.

3. In a velocipede, the combination of a frame located horizontally, a vertically-disposed frame on the rear portion of the aforesaid frame and supported in elevated position, a seat secured to said vertically-disposed frame, brake and steering mechanism, an axle connected to the rear portion of the said horizontal frame and having the ends thereof enlarged in the form of heads with two diametrically-opposed pawls on the outer faces of each of the same, and two diametrically-disposed teeth secured to the hubs of the wheels and located in the sand-bands thereof and adapted to be engaged by said pawls, said axle being operated by sprocket-wheels and a connecting chain belt, substantially as described.

4. In a velocipede, a horizontally-disposed A-shaped frame having a steering-wheel at the front end thereof and an axle at the rear of the same, brake and steering mechanism, a vertically-disposed frame supported by and above the rear portion of the aforesaid horizontally-disposed frame and composed of slotted bars, to the rearmost of one of which is secured a seat, a sprocket-wheel mounted in the upper portion of the said vertical frame and having adjustable cranks in connection therewith, composed of two sections sliding upon each other and controlled by a set-screw and nut, a sprocket-wheel on the axle, a chain belt connecting said sprocket-wheels, and clutch mechanisms on the ends of the axle and within the sand-boxes of the hubs of the wheel and consisting of two diametrically-opposed pawls engaging similarly-situated teeth in order to prevent backward movement of the rear wheels and of the machine entire, substantially as described.

In testimony that I claim the foregoing as my own I have hereto affixed my signature in the presence of two witnesses.

JOHN ROBERT WRIGHT.

Witnesses:
S. L. BARTHOLOMEW,
J. W. SPITLER.